C. J. SMITH & P. KLEEBERG.
CALCULATOR.
APPLICATION FILED AUG. 21, 1911.

1,017,182.

Patented Feb. 13, 1912.

C. J. SMITH & P. KLEEBERG.
CALCULATOR.
APPLICATION FILED AUG. 21, 1911.

1,017,182.

Patented Feb. 13, 1912.
5 SHEETS—SHEET 5.

UNITED STATES PATENT OFFICE.

CHESTER J. SMITH, OF JAMESTOWN, AND PHILIP KLEEBERG, OF NEW YORK, N. Y., ASSIGNORS TO NATIONAL CALCULATOR COMPANY, OF NEW YORK, N. Y.

CALCULATOR.

1,017,182.      Specification of Letters Patent.      Patented Feb. 13, 1912.

Application filed August 21, 1911. Serial No. 645,181.

*To all whom it may concern:*

Be it known that we, CHESTER J. SMITH, a citizen of the United States, residing at Jamestown, in the county of Chautauqua and State of New York, and PHILIP KLEEBERG, a citizen of the United States, residing in the borough of Manhattan, city, county, and State of New York, have invented certain new and useful Improvements in Calculators, of which the following is a specification.

Our improvements relate to means for facilitating the computation, with mathematical accuracy, of numerical problems and reckonings of various kinds, and for innumerable other purposes, as for instance the approximately instantaneous and correct calculation by the sellers or buyers individually of the amount of cost of goods sold; ascertaining wage compensation at prescribed rates for months, weeks, days, hours or fractions thereof; computing the cost of piece work, or cost of production in cost departments of any character; and so on *ad infinitum*.

The purport of our invention includes the production of practical apparatus of increased scope and capabilities, adapted to universal and diversified requirements.

It is also our object to so simplify and cheapen the construction of the apparatus as to render it available for extensive use in large numbers in department stores and other commercial enterprises and establishments where the cost of an adequate number of such devices would otherwise be practically prohibitory. In other words we seek to reduce the cost of manufacture of the apparatus to a commercial basis, at the same time rendering it capable of the greatest utility. To this end we have so devised and arranged our apparatus that relatively few parts are required, and all these are machine and die made to standard, and assembled without the aid of skilled labor, only ordinary care being requisite.

Hence, the invention consists in the specific construction and arrangement of parts described and claimed,—a distinguishing feature being the use of an internal basic structure consisting of inner journal plates united by stay rods, on which framework all the operative parts are mounted, as well as the inclosing shell or casing. Incidentally in this connection a feature of our novel construction is the formation of end compartments between outer and inner end plates, for the accommodation of the winding gears, &c.

Another distinctive feature is the use, in conjunction with the cylinders carrying a calculator-table sheet, of rotatable sight roller tubes arranged to present the said sheet to the sight slot without frictional wear or strain, and hence to conserve the life and integrity of the sheet, and render the use of thin paper for a calculator-table sheet practicable. These rotatable sight roller tubes also insure a uniform relation between sight slot and calculator-table sheet irrespective of the state of the wind,—the ends of the chart being presented at the same distance from the sight slot as the middle portion of the chart.

Still another feature of our invention is the use of wooden calculator-table sheet cylinders of special construction whereby the ends of the sheet may be conveniently, accurately and effectually secured to their respective cylinders as hereinafter set forth,— the substitution of wooden in lieu of metal cylinders materially decreasing the cost and weight of the apparatus, especially where several calculator-table sheets are to be accommodated in a single casing.

Other novel features relate to the external shell or casing, involving the use of a rectangular channel plate for the back and sides thereof, and of front and end plates of special construction, whereby the number of screws necessary to secure the parts together is reduced to the minimum, and the front and outer end plates are made to interlock for the purpose of insuring the accurate alinement of the sight slots, &c. Furthermore in order to adapt the apparatus for use in an inclined position, we provide it with a foldable brace of the special construction hereinafter set forth. And finally our invention embraces a calculator-table chart in which the units and principal fractions thereof are arranged successively in a longitudinal column, preferably though not necessarily centrally, on the sheet, with the various computations relating thereto extending therefrom in longitudinal alinement transversely across the sheet, so that computations of equivalents of numbers combining units and unit fractions may be readily found and ascertained at one reading,—whereas heretofore the unit equivalents and the equivalents of fractions had to be ascertained separately and then added together to get the sum total required. This we believe to be an important advance in the art, adapting the apparatus to the necessities and use of sellers and buyers and others ignorant of or unfamiliar with arithmetic, and in every case saving time and mental effort. It adapts the apparatus particularly to the requirements of large department stores and establishments using unskilled or uneducated employees.

In the accompanying drawings, Fig. 17, a top view of one of the calculator-table sheet cylinders, with the cap segment removed, and illustrating the method of attaching the calculator-table sheet.

Figures 8, 9, 10, 11, 12, 13, 14, 15, 16, 18, 19:
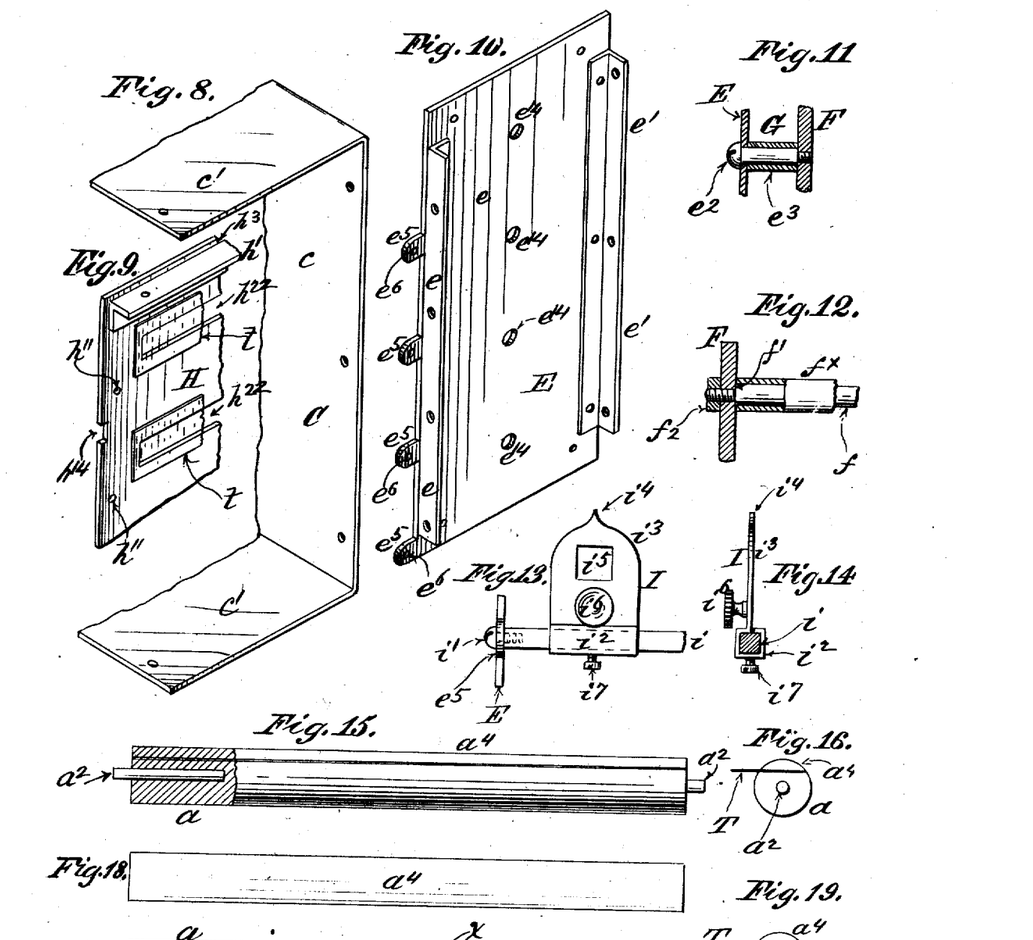
Fig. 8, is an isometrical view of one end of the rectangular channel plate constituting the rear and side walls of the casing.
Fig. 9, is an isometrical view of the inner side of an upper corner of the face plate.
Fig. 10, is an isometrical view of the inner side of an outer end plate.
Fig. 11, is a full size sectional detail showing one of the screws and spacing sleeves used for securing the end plates to the inner bearing plates.
Fig. 12, is a sectional detail full size illustrating the method of mounting of the sight roller tubes on stay rods.
Fig. 13, is a front view full size of one of the indicators.
Fig. 14, is a side elevation of an indicator and a cross section of its supporting rod.
Fig. 15, is an elevation, partly in section, of one of the calculating table sheet cylinders.
Fig. 16, an end view of the same.
Fig. 18, is a top view of the segmental cap of a calculator-table sheet cylinder.
Fig. 19, is an end view of one of the calculator-table sheet cylinders and its cap segment about to be applied to the cylinder to secure the end of the calculator-table sheet in position.

What may be designated as the basic structure or internal frame of the apparatus consists of the inner end journal plates F, F, united by the stay rods $f$, $f$. These stay rods have shoulders $f'$, near each extremity, said extremities being screw threaded and passing through holes prepared for their reception in said inner end journal plates F, F, with the shoulders $f'$, resting against the inner surfaces of said plates, in which position the stay rods $f$, $f$, are secured by nuts $f^2$, as shown in Fig. 12, in which instance however this particular stay rod is also shown as supporting one of the sight roller tubes $f^x$, hereinafter described.

The inner end journal plates F, F, are metallic, and of sufficient thickness to afford the requisite strength and stability, and to constitute in conjunction with the stay rods $f$, $f$, a rigid skeleton support for the casing as well as for the operative parts,—a sufficient number of stay rods $f$, $f$, being used and positioned to attain this result without adding unduly to the weight of the apparatus. In this connection it may be mentioned that the utilization of stay rods $f$, $f$, suitably placed, for the support of the sight roller tubes $f^x$, $f^x$, is an important factor in simplifying the structure, as few additional stay rods $f$, $f$, are required,—only sufficient to sustain and space the rear edges of the inner end journal plates F, F, it being understood that the sight tube rollers $f^x$, $f^x$, are arranged only at the front edges thereof.

The size of the inner end journal plates F, F, depends on the number of calculator-table sheets T, to be accommodated in the apparatus. One or more of these calculator-table sheets T, may be provided for, as may be found most expedient in view of the conditions and requirements of use. Thus, for computing ordinary time and wages, an apparatus containing a single calculator-table sheet T, will usually be sufficient, and the device will be correspondingly small and compact; whereas for calculating, for instance, the cost of goods sold in even a single line or department of a large retail establishment ten or more calculator-table sheets may be requisite, and there is practically no limit in this respect, since the parts and mechanism for each calculator-table sheet are simply duplicated, and the inner end journal plates F, F, and outer casing made to conform in size to the requirements. Thus in the accompanying drawings we have shown an arrangement of four calculator-table sheets T, by way of illustration, it being understood that we do not limit ourselves in this respect, and also that the character and functions of the calculator-table sheets incorporated in a single casing may be correlated or distinct, according to circumstances. In any case, as before stated the inner end journal plates F, F, and the stay rods $f$, $f$, constitute the basic frame of the device. Hence each driving shaft D, and the front and rear calculator-table sheet cylinders $a$, $a$, are mounted and supported directly upon said inner end journal plates F, F. Said front and rear cylinders $a$, $a$, are identical in size and construction, and are of relatively small diameter so as to accommodate a relatively long calculator-table sheet. In order to render them of light weight and to reduce their cost to the minimum we form each cylinder $a$, $a$, of thoroughly seasoned wood, with metal trunnions $a^2$, $a^2$, driven into axial sockets formed for their reception in the ends of the cylinder, as illustrated in Fig. 15. We find these wooden calculator-table cylinders much superior for the purpose than metallic cylinders, and where a number of calculator-table sheets are to be incorporated in a single apparatus the reduction in weight as well as of expense is an important practical consideration. Furthermore by the use of wooden cylinders $a$, $a$, we are enabled to provide effectually for the accurate and secure adjustment of each end of a calculator-table sheet T, to its cylinder. This we accomplish by sawing off a strip of each cylinder longitudinally and parallel to its axis, thereby forming a flat longitudinal bearing surface $a^3$, the strip removed forming a segmental cap $a^4$, having a correspondingly flat surface $a^5$. The material removed by the saw being equivalent to the thickness of the paper on which the calculator-table is printed or otherwise imposed, it is obvious that when the edge of the sheet T, is interposed between the flat surface $a^3$, on the main portion of the cylinder and the opposed flat surface $a^5$, on the segmental cap $a^4$, a perfectly true cylinder will result. Hence, provided the edge of the calculator-table sheet T, is cut straight, and at right angles to the longitudinal edges of the sheet, and provided also that reasonable care is taken in placing such edge of the sheet along an edge of the flat surface $a^3$, or parallel to such edge which performs the function of a guide line, it is obvious that the sheet may be accurately placed and tacked onto the main portion of the roller without the use of extraordinary skill, or the expenditure of much time or labor. The subsequent application of the segmental cap $a^4$, is also a simple operation, it being placed on top of the tacked end of the calculator-table sheet and secured to the main portion of the roller by brads, the outer ends of which are countersunk into the wood so as to afford a smooth peripheral surface for the entire cylinder. We thus attain by simple and inexpensive means a perfect cylinder to which the calculator-table sheet may be quickly and conveniently secured with accuracy, thereby insuring the correct alinement of the sheet during use,—a result that is further safe-guarded by making the cylinders $a$, $a$, substantially the full length of the space between the inner end journal plates, and the calculator-table sheets substantially the equivalent thereof in width, so that the inner surfaces of said inner end journal plates F, F, act as guides between which the sheet travels without looseness or lateral displacement.

The metal trunnions $a^2$, of the wooden cylinders are journaled in bearing holes formed for the purpose in the inner end journal plates F, F. In like manner each driver shaft D, used is journaled in said inner end journal plates F, F.

Each driving shaft D, is formed with a collar $d$, to engage the outer side of one of the inner end journal plates F, F, the hub of the driving gear $d'$, on the other end of said shaft constituting a similar bearing against the outer surface of the other inner end journal plate F, and thereby locking the driving shaft against longitudinal movement. A pinion $d^3$, on the trunnion $a^2$, at one end of each of the calculator-table cylinders $a$, meshes with the central driving gear $d'$, so that when the driving shaft D, is rotated the cylinders $a$, $a$, will be turned in the same direction to transfer the calculator-table sheet T, from one cylinder to the other according to the direction of the motion imparted to said driving shaft D.

Figure 20:
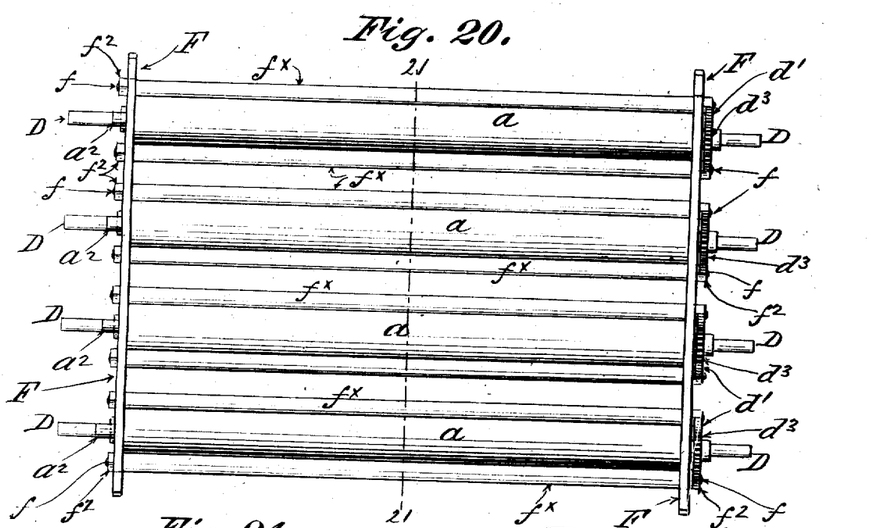
Fig. 20, is an elevation of the inner basic structure prior to the application of the casing, &c., the calculator-table sheets being omitted for the sake of clearness.
Figure 21:
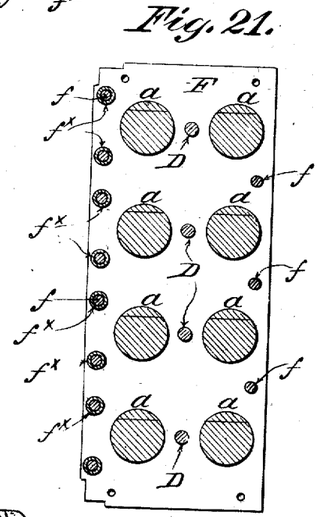
Fig. 21, is a vertical section taken upon plane of line 21—21 Fig. 20.
Figure 22:
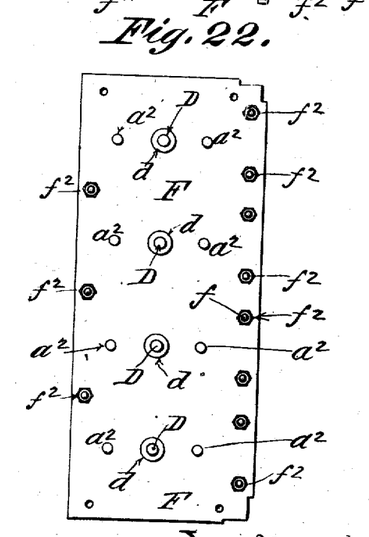
Fig. 22, is an elevation of the left hand inner end of the frame shown in Fig. 20.

In assembling the parts the skeleton frame consisting of the inner end journal plates F, F, and stay rods $f$, $f$, (including those carrying the sight roller tubes $f^x$, $f^x$,) are first secured together by the nuts $f^2$, $f^2$, and the driving shaft D, and calculator-table cylinders $a$, $a$, are then mounted upon and between the inner end journal plates F, F, to form the basic structure shown in Figs. 20, 21, and 22,—the calculator-table sheets not being included in these views so as to show the other parts more clearly. To this basic structure the outer end plates E, E, are now added. They are both alike, except that the internal flanges $e$, $e'$, are necessarily on the inner sides of the plates. These flanges $e$, $e'$, consist of metallic angle bars riveted to the front and rear portions of each outer end plate E, E, the flanges $e$, $e'$, being flush with the edges thereof. The outer end plates E, E, are secured to the inner end journal plates F, F, by means of screw bolts $e^2$, $e^2$, as shown in Fig. 11, by reference to which it will be seen that the said screw bolts pass through the outer plates E, and through spacing sleeves $e^3$, and engage with screw threads tapped in the inner end journal plates F, F,—the spacing sleeves $e^3$, creating end spaces or compartments G, between the said inner end journal plates F, F, and said outer end or casing plates E, E. These end compartments G, G, afford room for the gearing $d'$, $d^8$, at one end of the apparatus, and for the nuts $f^2$, at both ends, by which the stay rods $f$, are secured to the inner end journal plates F, F, as before described. They also accommodate the protruding ends of the trunnions $a^2$.

The ends of the driving shafts D, D, extend through holes $e^{14}$, in the outer end plates E, these holes being of slightly larger diameter than the diameter of the shafts so that the latter run free therein, being supported and journaled entirely in the heavier inner end journal plates F, F, thereby relieving the outer end plates E, E, and the rest of the casing connected therewith, of all strain of operation. In fact it is our object to make the rigid skeleton frame, consisting of the inner end journal plates F, F, and stay rods $f$, $f$, bear all the strain and wear of the operative parts, as well as to support the outer shell or casing. Both extremities of each driving shaft D, are provided with knobs $k$, $k$, to facilitate the manipulation of the calculator-table attached to the cylinders $a$, $a$, controlled by the gear on that particular driving shaft. The outer end plates E, E, being secured to the inner end journal plates F, F, as above set forth, the front and rear flanges $e$, $e'$, on the inner sides of the said outer end plates E, E, are utilized for the support of the rest of the casing. Thus the bent rectangular channel plate C, constituting the inclosing rear wall $c$, and side walls $c'$, $c'$, is secured to the rear flanges $e'$, $e'$, by means of screws $c^2$, $c^2$, while the front or face plate H, is secured to the front flanges $e$, $e$, by means of screws $h$.

The making of the back wall $c$, and side walls $c'$, $c'$, in one piece in the form of a rectangular channel plate C, (see particularly Fig. 8, of the drawings) greatly simplifies and cheapens the structure and facilitates the assembling of the parts. By its use we dispense with flanges and fastenings that would otherwise be necessary, were three separate plates used for the purpose, and which would add to the weight and cost of the apparatus, as well as complicate the structure. Furthermore the one piece rectangular channel plate C, acts as a stiffener for the whole shell or casing and adds materially to the strength of the structure as a whole.

The rear wall $c$, being secured to the rear flanges $e'$, $e'$, of the outer end plates E, E, by the screws $c^2$, $c^2$, the front edges of the side walls $c'$, $c'$, are secured to the front or face plate H, when the latter is in position. For this purpose top and bottom flanges $h'$, $h^2$, are provided on the rear side of the face plate H, consisting of rectangular strips of metal riveted to said face plate parallel to the upper and lower edges thereof and in proximity thereto, thus forming offsets $h^3$, $h^4$, equal to the thickness of the sheet metal of which the rectangular channel plate C, is formed, so that when the front edges of the side walls $c'$, $c'$, are secured to the flanges $h'$, $h^2$, by the screws $c^3$, $c^3$, the outer surfaces of the said side walls $c'$, $c'$, will be flush with the upper and lower edges respectively of the face plate H, as will be seen more particularly by reference to Figs. 4 and 5 of the drawings.

The face plate H, itself is secured to the front flanges $e$, $e$, on the outer end plates E, E, by the screws $h$, $h$, which are also utilized for the purpose of securing the rate scale holders R, R, in position on the face plate H, thereby dispensing with special screws for either purpose, it being our object to dispense with as many screws and parts as possible.

The face plate H, consists of a simple, flat sheet of metal having the screw holes $h''$, and longitudinal sight slot or slots $h^{22}$, stamped out of it by dies.

In order to be effective in use it is essential that the sight slot or slots $h^{22}$ be absolutely true and accurate in shape and alinement especially where several of them have to be provided in a single plate as in the apparatus herein shown and described. Hence we have adopted a flat form of face plate reinforced longitudinally by the rectangular flanges $h'$, $h^2$, at the edges, said flanges answering the double function of stiffening the face plate and of affording means of attachment to the edges of the side members $c'$, $c'$, of the rectangular channel plate C, as before stated.

The flat face plate H, is stiffened transversely by its attachment to the flanges $e$, $e$, on the outer end plates E, E, so that all things considered, there is practically no chance for it to bend, warp or buckle in any direction whatsoever under ordinary conditions of use. This enables us to use lighter, thinner metal plate than would otherwise be expedient, thereby saving in cost and weight without endangering the alinement of the sight slot or slots. In this connection it may also be stated that owing to the provision of the internal rigid basic frame structure consisting of the inner end journal plates F, F, and stay rods $f$, $f$, we are enabled to use comparatively light, thin sheet metal for the whole casing.

Each sight slot $h^{22}$ has a backing of transparent material $t$, consisting preferably of a strip of gelatin or equivalent, glued or otherwise secured to the back side of the face plate H, as indicated in Fig. 9. The transparent material thus used is light and thin, and admits of the travel of the calculator-table sheets in close proximity to the sight slot $h^{22}$. By thus sealing the sight openings $h^{22}$, we exclude dust and extraneous matter and things without obstructing the view of the portion of a calculator-table T, brought opposite to said sight openings.

By reference to Fig. 4, it will be seen that guide roller tubes $f^x$, $f^x$, for each calculator-table sheet T, are arranged above and below each sight opening $h^{22}$, so as to stretch and hold taut, straight and smooth the portion of the sheet exhibited through the sight opening $h^{22}$, and adjacent thereto, and as above intimated they are positioned between the inner end journal plates F, F, close to the front edges thereof so as to present the calculator-table sheet T, as close to the transparent material $t$, as possible without actual contact therewith.

The avoidance of frictional wear on a calculator-table sheet is obviously an important consideration as related to its life and usefulness, and for this reason we provide the guide roller tubes $f^x$, $f^x$, which are free to rotate on the stay rods $f$, $f$, and to travel peripherally with the sheet in actual contact therewith, so as to avoid frictional drag or strain on the sheet. We are aware that parallel guide rods have been used for the purpose of presenting a calculating sheet to a longitudinal sight opening, but we have found the frictional resistance afforded thereby to the travel of the sheet a serious objection for two reasons, i. e., it soon impairs and destroys the integrity of the calculator-table sheet when made of paper, as is most desirable for economical reasons, and it renders the operation of the apparatus hard, uncertain and difficult.—whereas by our method of passing the sheet over and around rolling tubes resistance is reduced to the minimum, as is also the wear and tear upon the calculator-table sheet, thus enabling us to use comparatively thin, inexpensive paper in the formation thereof, and to attain a relatively long comprehensive calculator-table on a sheet of light weight and small bulk when rolled up. Futhermore the use of thin paper in the formation of the calculator-table sheets enables us to economize space in the apparatus, rendering it lighter and more compact than would be possible if thick, heavy paper strong enough to withstand frictional resistance, had to be accommodated and used.

The front edges of the outer end plates E, E, are formed with tongues or extensions $e^5$, $e^5$, which project forward through notches $h^{14}$, $h^{14}$, formed for them in the adjoining edges of the face plate H, and constitute brackets for the support of the indicator rods $i$. This interlocking of the edges of the face plate H, and the outer end plates E, E, strengthens the structure, and enables us to dispense with securing screws that would otherwise be necessary. It also insures the centralization and correct alinement of the sight slots $h^{22}$, and furthermore enables us to utilize the indicator rods $i$, $i$, and the screws $i'$, $i'$, by which they are secured to the lugs or brackets $e^5$, $e^5$, as means for further bracing and staying the outer end plates E, E.

The bracket lugs $e^5$, $e^5$, are formed with holes $e^6$, $e^6$, for the shanks of the securing screws $i'$, $i'$, which latter engage with female threads tapped in the ends of the indicator rods $i$, $i$, as indicated particularly in Fig. 13.

In the present case we use an indicator slide rod $i$, which is angular in cross section, preferably though not necessarily square, and an indicator I, formed with a sleeve $i^2$, conforming in shape to and fitting upon said angular indicator slide rod $i$,—the object being to prevent the turning of the indicator I, upon the slide rod $i$, and insure the proper and prescribed extension of the indicator plate $i^3$, over and parallel to, but out of contact with, the rate index scale R, and the sides of the sight openings $h^{22}$. The indicator plate $i^3$, and the sleeve $i^2$, are formed of one piece of sheet metal stamped out by means of suitable dies to form the pointer $i^4$, and the reading opening $i^5$, and bent up to form the angular sleeve $i^2$.

The indicator I, is provided with a handle $i^6$ to facilitate the operation of sliding it back and forth upon the rod $i$, and it is also provided with a set screw $i^7$, by which it may be secured, for the time being, in a prescribed position with relation to the rate scale R, as for instance, where certain articles of like character are to be sold on a "bargain day" or set time, at a "special" price, or where it is desired to figure up the value of wages at the same rate per hour for a plurality of hours and fractions thereof, and so on.

Our improved calculating device is adapted for use in various positions. For instance, it may be laid down flat upon its back, for which reason the back plate $c$, is provided with buffer pads $p$, $p$; it may be stood on end vertically; or it may be inclined as represented in Fig. 3,—the front plate H, in either case being exposed to view and accessible.

Figure 3:
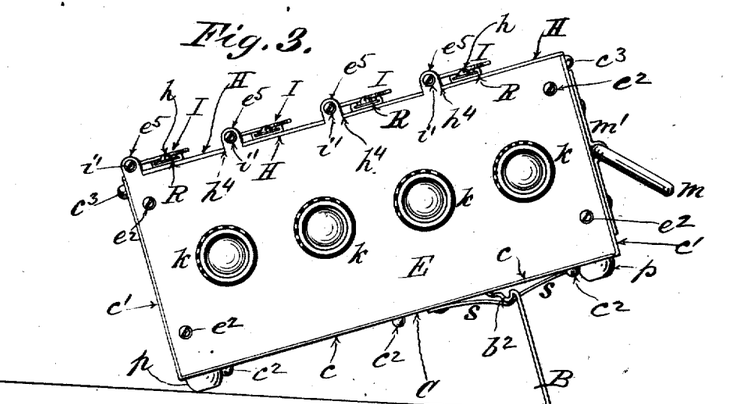
Fig. 3, is an end elevation showing the device in an inclined position.
Figure 4:
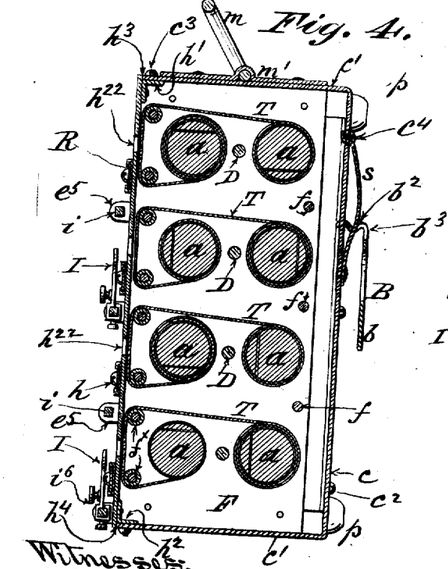
Fig. 4, is a central vertical transverse section taken upon plane of line 4—4 Figs. 1 and 6.
Figure 5:
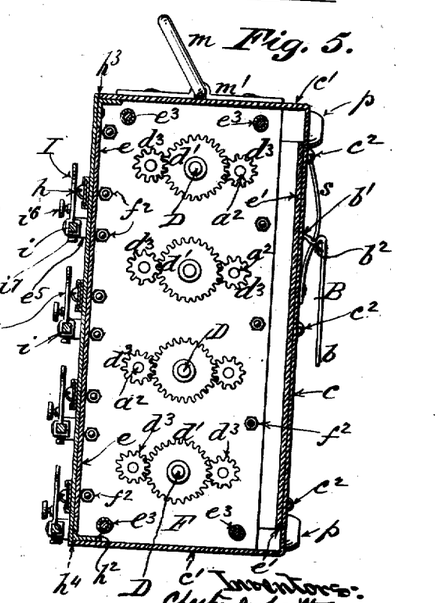
Fig. 5, is a transverse vertical section taken upon plane of line 5—5 Fig. 1.
Figure 6:
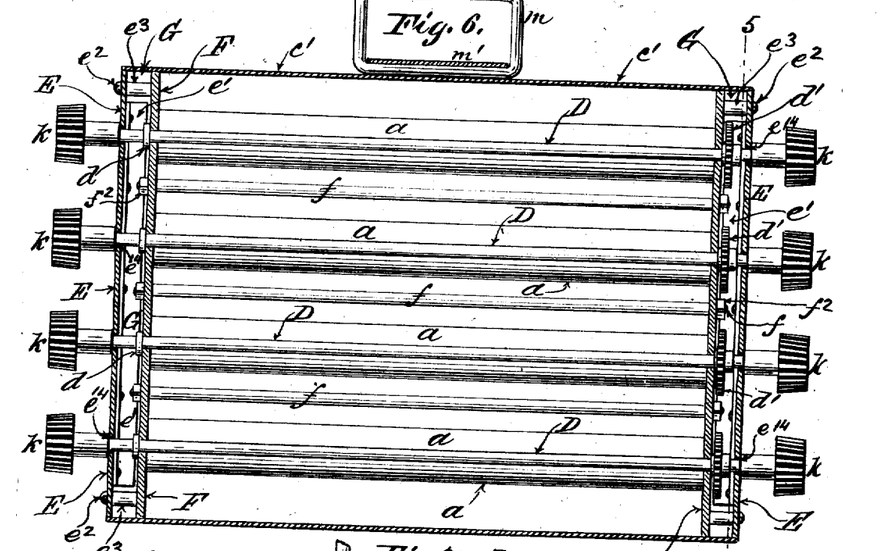
Fig. 6, is a central longitudinal sectional elevation of the device, the calculator-table sheets being omitted.
Figure 7:
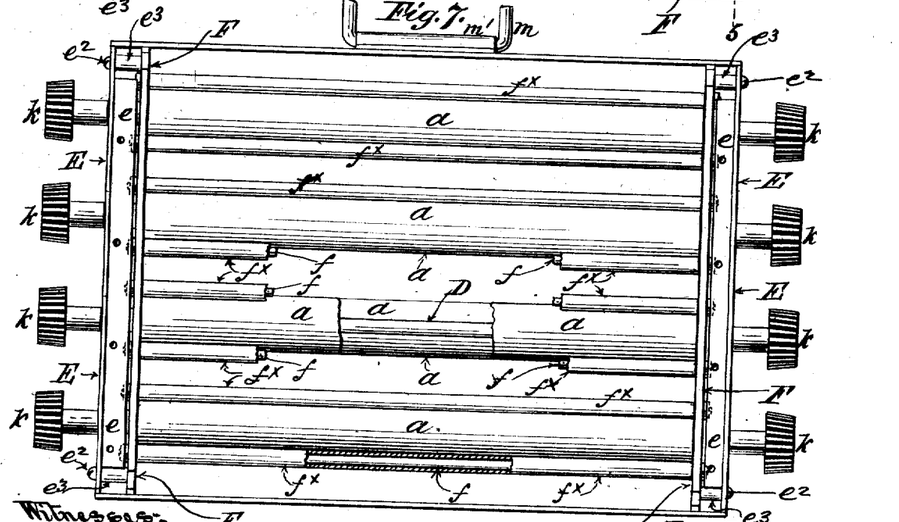
Fig. 7, is an elevation of the device with the face plate removed, parts being broken away and the calculator-table sheets being omitted for convenience of illustration.

In order to provide for the support of the device in an inclined position as shown in Fig. 3, we form the back plate $c$, with a foldable brace B, articulated thereto, and consisting of a plate $b$, of sheet metal having tongues $b'$, $b'$, fitting in slots $c^{33}$, $c^{33}$, in the back plate $c$, (see Fig. 4). Adjacent to the tongues $b'$, $b'$, the plate is bent longitudinally in the form of a rib or bead $b^2$. A flat metal spring $s$, riveted at one end to the back plate $c$, and having its other extremity bent to fit into a slot $c^4$, formed for its reception in the back plate $c$, also extends medially through an opening $b^3$, in the plate $b$, and bears against the inner edge of said opening with sufficient force to hold the plate *b*, either folded parallel to the back plate *c*, or approximately at right angles thereto, as in said Fig. 3,—the bend formed by the rib of bead $b^2$, acting as an eccentric.

In order to facilitate the handling and transportation of the device it is provided with a foldable handle *m*, consisting of a rectangular loop formed of a bent cylindrical rod of suitable diameter, held in place by a knuckle plate *m'*, riveted to the upper side plate.

Our construction and arrangement of parts is the result of extensive experimental investigation undertaken expressly for the purpose of attaining an adequate device of such simple, inexpensive structure as to be adapted to, and available for, universal use as a price calculator for department stores and the commercial trade generally, as well as for computing time, wages, &c., in various manufactories and occupations. It will be seen that while there is a duplication of parts, the latter are relatively speaking simple in character and few in number, and being all machine made to a standard may be readily assembled without the aid of skilled labor, only ordinary care being required for the purpose. We are thus also enabled to greatly increase the scope and utility of the apparatus while reducing its size, weight and cost.

Aside from the mechanical features hereinbefore described, we have originated a new form of calculator-table sheet for use therein, in which provision is made for computing at one reading, equivalents of fractions of a unit as well as unit equivalents. In this respect our apparatus and calculator-table sheet represent a decided and important advance over the system and apparatus disclosed in Letters Patent No. 998,414 issued to C. J. Smith July 18th, 1911, in which the unit equivalent and the fractional equivalents have to be ascertained and read off separately and then added together to get the sum total,—whereas by the use of our improved calculator-table T, shown in part in Fig. 17, in which the units and fractions thereof are arranged successively in the central column *x*, with the various computations relating thereto extending in longitudinal alinement on either side thereof and transversely across the sheet, by simply moving the index I, to a position in which the prescribed rate in the rate scale, R, is visible through the sight opening $i^5$, the point $i^4$, of the indicator I, will immediately designate the correct answer or reading, without need of mental effort or calculation. Thus by way of illustration, suppose it is desired to ascertain the value of 2⅛ yards of cloth at 37½ cents per yard, or the value of 2⅛ hours time at 37½ cents per hour, in such case the calculator-table sheet is turned until the figures 2⅛ in the central column *x*, show through the longitudinal sight slot $h^{22}$, and the indicator I, is moved until 37½ shows through its sight opening $i^5$, when the point $i^4$, will designate the result sought, namely 80 cents,—the same rule of use applying throughout.

By our new chart we practically afford an instantaneous reading of computations relating to fractional parts as well as to units, thereby greatly increasing the scope and usefulness of the apparatus, besides economizing time and adapting the system to the use and requirements of the ignorant and inexperienced.

It is obvious that the fractional calculator-table above described may be embodied not only in a traveling sheet as herein set forth, but also be imposed directly upon a calculator cylinder such for instance as those shown and described in Letters Patent 998,414 hereinbefore referred to.

Figure 1:
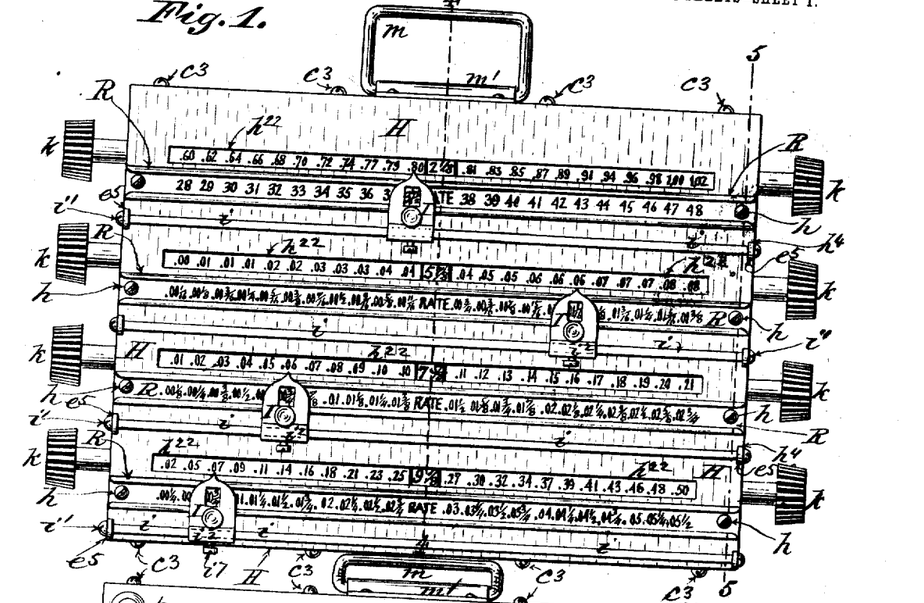
Figure 1, is an elevation of the face or front side of our improved calculating device.
Figure 2:
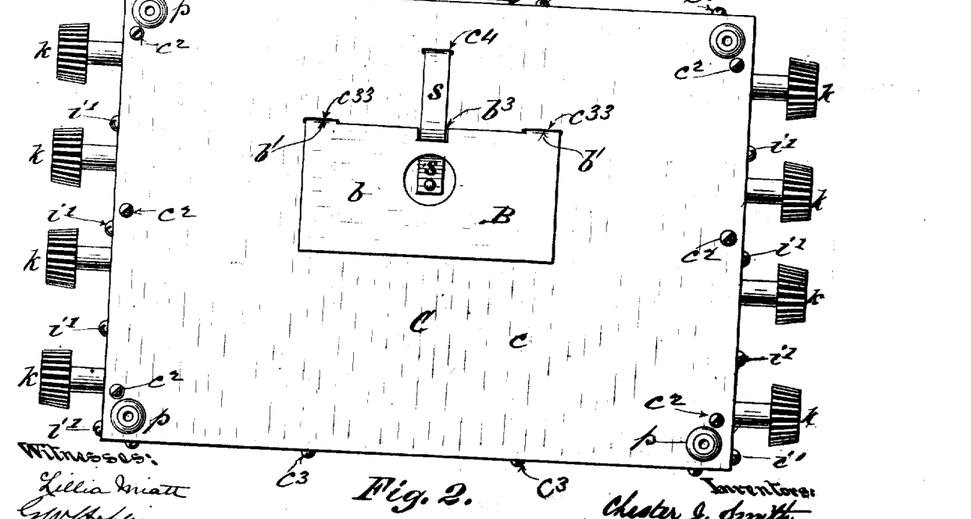
Fig. 2, an elevation of the rear side of the same.

In Fig. 1, the upper indicator I, is set, and the upper calculator table sheet represented as turned to show the computation given above by way of illlustration; and all the rate scales and calculator sheets shown in said figure are adapted for use in various problems,—the units in the calculator table sheets standing either for pounds, ounces, feet, inches, gross, dozen, hours or minutes and so forth, as the case may be, and the fractional figures representing the fractional parts thereof, while the figures in the rate scales indicate various prices, or vice versa, that is to say the figures in the central columns on the calculator table sheets may be used to represent the price rates, and the figures in the rate scales R, the quantities,— the indicator point designating the price computation.

What we claim as our invention and desire to secure by Letters Patent is,

1. In a calculating machine, an inner supporting frame for the cylinders, driving and actuating mechanism, outer end plates on said frame, and an open-ended channel casing for inclosing the same and of which said end plates of said basic frame form the end walls.

2. In a calculating machine, a channel plate, a basic supporting frame comprising inner journal plates, outer end plates connected therewith, said inner end plates forming supports for the cylinders and driving mechanism, and a face plate removably connected with said channel plate and the basic frame.

3. In a calculating machine, a channel plate, a bodily removable basic supporting frame embodying journal plates for the support of the cylinders and their actuating and driving means and end plates removable with the basic frame, a removable face plate, and means for detachably securing said removable frame to the channel plate and to the face plate.

4. In a calculating machine, a channel plate forming the back and side walls of a casing, a removable face plate having a continuous longitudinal slot, and a bodily removable basic frame forming the support for the cylinders and driving means, and plates removable with the basic frame and forming the end walls of the casing.

5. In a calculating machine, a channel plate forming the back and side walls of a casing, a removable face plate having a continuous longitudinal slot, and a bodily removable basic frame forming the support for the cylinders and driving means, and plates removable with the basic frame and forming the end walls of the casing, said face plate being flanged and the removable member having flanges for detachable connection with said face plate and the rear wall of the casing.

6. In calculating apparatus of the character designated, a basic frame work upon which the other parts are supported, consisting of inner end journal plates spaced apart, outer end plates, screw bolts connecting said inner and outer plates, spacing sleeves on said bolts separating the said outer end plates from the inner end journal plates and creating compartments between them for the accommodation of gearing, journals, etc., and an inclosing sheet metal casing secured to said outer end plates and formed with a longitudinal sight slot.

7. In calculating apparatus of the character designated, a basic frame work upon which the other parts are supported, consisting of inner end journal plates spaced apart, outer end plates, screw bolts connecting said inner and outer plates, spacing sleeves on said bolts separating the said outer end plates from the inner end journal plates and creating compartments between them for the accommodation of gearing, journals, etc., and an inclosing sheet metal casing secured to said outer end plates and formed with a longitudinal slot and embodying a one piece channel plate constituting the back and longitudinal sides of the casing.

8. In calculating apparatus of the character designated, a basic frame work upon which the other parts are supported consisting of inner end journal plates and stay bolt rods connecting and spacing apart said inner end journal plates, outer end plates secured to said inner end journal plates, screw bolts, spacing sleeves on said bolts separating the said outer end plates from the inner end journal plates and creating compartments between them for the accommodation of gearing, journals, etc., an inclosing sheet metal casing secured to said outer end plates and consisting of a one piece channel plate constituting the back and sides of the casing, and a front plate formed with upper and lower inner edge angle bars which stiffen the front plate and to which the edges of the channel plate are secured, said front plate being also formed with a longitudinal sight slot.

9. In calculating apparatus of the character designated, a basic frame work upon which the other parts are supported consisting of inner end journal plates and stay bolt rods connecting and spacing apart said inner journal plates, outer end plates secured to said inner end journal plates, screw bolts separating the said outer end plates from the inner end journal plates and creating compartments between them for the accommodation of gearing, journals, etc., front and rear flanges disposed between said outer end plates and inner journal plates, an inclosing sheet metal casing consisting of a one piece channel plate secured to said rear flanges and constituting the back and sides of the casing, a front plate secured to the said front flanges, said front plate being also formed with a longitudinal sight slot.

10. In calculating apparatus of the character designated, a basic frame work upon which the other parts are supported consisting of inner end journal plates spaced apart, outer end plates secured to said inner end journal plates, screw bolts separating the said outer end plates from the inner end journal plates and creating compartments between them for the accommodation of gearing, journals, etc., front and rear flanges disposed between said outer end plates and inner journal plates, an inclosing sheet metal casing consisting of a one piece channel plate secured to said rear flanges and constituting the back and sides of the casing, a front plate secured to the said front flanges, said front plate being formed with upper and lower inner edge flanges composed of metallic angle bars which stiffen the front plate and to which the edges of the channel plate are secured, said front plate being also formed with a longitudinal sight slot.

11. In calculating apparatus of the character designated, a basic frame work upon which the other parts are supported consisting of inner end journal plates spaced apart, outer end plates secured to said inner end journal plates and having bracket lugs projecting from their front edges, screw bolts, spacing sleeves on said screw bolts separating the said outer end plates from the inner end journal plates and creating compartments between them for the accommodation of gearing, journals, etc., an inclosing sheet metal casing secured to said outer end plates and consisting of a one piece channel plate constituting the back and longitudinal sides of the casing, and a front plate formed with a longitudinal sight slot, said face plate being also formed with recesses to receive and interlock with said bracket lugs, an indicator slide rod mounted between and secured to said bracket lugs, and an indicator slidable on said rod.

12. In calculating apparatus of the character designated, a basic frame work upon which the other parts are supported consisting of inner end journal plates and stay bolt rods connecting and spacing apart said inner end journal plates, outer end plates secured to said inner end journal plates, screw bolts, spacing sleeves on said screw bolts separating said outer end plates from the inner end journal plates and creating compartments between them for the accommodation of gearing, journals, etc., guide sight rollers consisting of roller tubes mounted between said inner end journal plates on the front stay rods, and an inclosing sheet metal casing secured to said outer end plates and formed with a longitudinal sight slot.

13. In calculating apparatus of the character designated, a series of units embodying a basic frame work upon which the other parts are supported, an inclosing sheet metal casing secured to said frame work, a foldable bracket attached to the back plate of the casing and consisting of a flat metal plate formed with tongues fitting in slots in the back plate, and a flat metallic spring attached to the back plate and bearing upon a shoulder upon said brace plate.

14. In calculating apparatus of the character designated, series of units embodying a basic frame work upon which the other parts are supported, an inclosing sheet metal casing secured to said frame work, a foldable bracket attached to the back plate of the casing and consisting of a flat metal plate formed with tongues fitting in slots in the back plate, and a flat metallic spring attached at both ends to the back plate and bearing medially upon a shoulder upon said brace plate.

CHESTER J. SMITH.
PHILIP KLEEBERG.

Witnesses:
GEO. WM. MIATT,
LILLIA MIATT.